(12) United States Patent
Khaishgi et al.

(10) Patent No.: US 7,020,634 B2
(45) Date of Patent: *Mar. 28, 2006

(54) CERTIFICATION AND UNIQUE ELECTRONIC SEALS FOR ONLINE ENTITIES

(75) Inventors: Ahmed Khaishgi, San Francisco, CA (US); John Quinn, San Francisco, CA (US)

(73) Assignee: SquareTrade, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/643,263

(22) Filed: Aug. 19, 2003

(65) Prior Publication Data

US 2004/0034605 A1    Feb. 19, 2004

Related U.S. Application Data

(63) Continuation of application No. 09/634,149, filed on Aug. 8, 2000, now Pat. No. 6,658,394.

(51) Int. Cl.
*G06F 17/60* (2006.01)

(52) U.S. Cl. .............. 705/50; 705/1; 705/58; 705/62; 705/53; 705/54; 705/55

(58) Field of Classification Search ......... 705/51, 705/50, 1, 53–55, 58, 62; 713/176
See application file for complete search history.

(56) References Cited

U.S. PATENT DOCUMENTS

| | | | |
|---|---|---|---|
| 5,495,412 A | 2/1996 | Thiessen | |
| 5,668,953 A | 9/1997 | Sloo | |
| 5,893,117 A * | 4/1999 | Wang | 707/203 |
| 5,893,905 A | 4/1999 | Main et al. | |
| 5,895,450 A | 4/1999 | Sloo | |
| 5,956,687 A | 9/1999 | Wamsley et al. | |
| 5,970,475 A | 10/1999 | Barnes et al. | |
| 6,237,096 B1 | 5/2001 | Bisbee et al. | |
| 6,330,551 B1 | 12/2001 | Burchetta et al. | |
| 6,347,332 B1 | 2/2002 | Malet et al. | |
| 6,363,384 B1 | 3/2002 | Cookmeyer, II et al. | |
| 6,389,151 B1 | 5/2002 | Carr et al. | |
| 6,442,687 B1 | 8/2002 | Savage | |
| 6,470,448 B1 * | 10/2002 | Kuroda et al. | 713/176 |
| 6,766,307 B1 | 7/2004 | Israel et al. | |

(Continued)

FOREIGN PATENT DOCUMENTS

EP    0 689 824 A1    1/1996

(Continued)

OTHER PUBLICATIONS

US Provisional Appl. 60/280,037.*

(Continued)

*Primary Examiner*—James P. Trammell
*Assistant Examiner*—John Winter
(74) *Attorney, Agent, or Firm*—Shumaker & Sieffert, P.A.

(57) ABSTRACT

The invention provides techniques for issuing electronic seals of certification to online entities, such as online merchants, in a manner that prevents non-certified parties from easily stealing or otherwise misusing the seals. A central seal issuer verifies the credentials, policies or business practices of each merchant and issues a corresponding seal of certification. For each merchant, the seal issuer generates a unique media object representing an electronic seal. The media object includes an encrypted watermark containing an expiration date. The media objects are stored on a seal server such that the merchants can dynamically retrieve and display the electronic seals when accessed by a user. The seal issuer can easily revoke or update the centrally stored seals.

91 Claims, 4 Drawing Sheets

U.S. PATENT DOCUMENTS

| | | |
|---|---|---|
| 2001/0007106 A1 | 7/2001 | Slaikeu |
| 2002/0007362 A1 | 1/2002 | Collins et al. |
| 2002/0038293 A1* | 3/2002 | Seiden .................. 705/80 |
| 2003/0028762 A1* | 2/2003 | Trilli et al. ............... 713/153 |
| 2003/0188194 A1 | 10/2003 | Currie et al. |
| 2004/0210527 A1 | 10/2004 | Woda et al. |

FOREIGN PATENT DOCUMENTS

| | | |
|---|---|---|
| JP | 2003-114927 | 10/2001 |
| JP | 2003085383 | * 3/2003 |

OTHER PUBLICATIONS

US Provisional Appl. 60/309,203.*
PDF for lawyers (date unknown).*
Bordone, Robert C., "175 Electronic Online Dispute Resolution: A Systems Approach-Potential, Problems, and a Proposal," Harvard Negotiation Law Review, pp. 175-211, 1998, http://cyber.law.harvard.edu/property00/jurisdiction/bordoneedit.html.
Chua, Lusan, "Ebay: Conflict Management in an Online Community," 2002, http://www.ombuds.org/cyberweek2003/chua.paper.htm.
Devack, Melissa, "Intellectual Property As An Investment: A Look At How ADR Relates to the European Union's Proposal for Electronic Commerce in the Single Market," 2002, http://www.cardozo.yu.edu/cojcr/final_site/articles_notes/vol2_an/Devack.htm.
Geist, Michael, "Fair.com?: An Examination of the Allegations of Systemic Unfairness in the ICANN UDRP," University of Ottawa, Aug. 2001, http://aixl.uottawa.ca/~geist/geistudrp.pdf.
Gilbert, Pamela, "On Space, Sex and Stalkers," http://www.echonyc.com/~women/Issue17/art-gilbert.html.
Johnson, David R., "Dispute Resolution in Cyberspace," http://www.eff.org/Legal/Arbitration/online_dispute_resolution_johnson.article, Feb. 1994.
Katsh, Ethan M., "Dispute Resolution in Cyberspace," Conn. L. Rev., 1996, http://www.umass.edu/legal/articles/uconn.html.
Katsh, Ethan et al., E-Commerce, E-Disputes, and E-Disputes Resolution: In the Shadow of "eBay Law", Ohio State Journal on Dispute Resolution, vol. 15:3, pp. 705-734, 2000.
Manevy, Isabelle, "Online Dispute Resolution: what future?" Jun. 2001, http://www.ombuds.org/cyberweek2002/manevy_odr01.pdf.
Mudd Jr., Charles Lee, "Cybercourt: A Virtual Resolution of Differences," 1995, http://www.mudd.org/professional/articlesclm/cybercourt.htm.
Rabinovich-Einy, Orna, "The Ford-Firestones of the Future: Resolving Offline Disputes in an Online Society," http://www.ombuds.org/cyberweek2003/rabinovich_einy.htm.
Schneider, Michael E. et al., "Dispute Resolution in International Electronic Commerce," http://www.disputes.net/cyberweek2001/interElecCommerce.htm.
SchWeber, Claudine, "The Use of Technology in Conflict Resolution," 1995, http://www.batnet.com/oikoumene/arbtadr.html.
Thiessen, Ernest et al., "Beyond Win- Win in Cyberspace," Ohio State J. of Dispute Resolution, 2000, 15(3), 643, http://www.smartsettle.com/more/beyond/BeyondWinWin.html.
"ADR Resources," Center for Information Technology and Dispute Resolution, http://www.ombuds.org/center/articles1.
"Code of Online Business Practices," Council of Better Business Bureau, Inc., 2003, http://www.bbbonline.org/reliability/code/code.asp.
"Disputes in cyberspace 2001," Update for Online Disputes Resolution for Consumers in Cross-Border Disputes, Office for Developed and Transition Economies, Consumers International, Nov. 2001.
"Out-of-Court Dispute Settlement Systems for E-Commerce," The Report form the workshop held in Brussels, European Commission Report.
"Proceedings of a Conference on Electronic Dispute Resolution," National Center for Automated Information Research (NCAIR), May 22, 1996, Washington D.C.
Declaration of Ethan Katsh Under 37 C.F.R. 1.132.
Explanation of 'contract' and 'marketplace' printed from http://www.dictionary.com.
Information on Bell Atlantic, 1998, 1999.
Information on Neural Tech, Inc., 1996-1998.
Unisys to market Neural Tech CADRE software as part of its credit card dispute processing solution set, Oct. 22, 1998.
U.S. Appl. No. 09/504,159, filed Feb. 15, 2000, entitled "Electronic Dispute Resolution System," by Khaishgi, Ahmed et al.
U.S. Appl. No. 10/634,654, filed Aug. 5, 2003, entitled "System and Method for Resolving a Dispute in Electronic Commerce and Managing an Online Dispute Resolution Process," by Khaishgi, Ahmed et al.
U.S. Appl. No. 10/672,136, filed Sep. 26, 2003, entitled "Automated Online Dispute Resolution," by Khaishgi, Ahmed et al.
http://www.arb-forum.com—National Arbitration Forum.
http://www.i-courthouse.com—I-Courhouse, Inc.
http://www.internetneutral.com—Internet Neutral.
http://www.arbiter.wipo.int/arbitration/—WIPO Arbitration and Mediation Center.
http://clicknsettle.com—clickNsettle.com, Inc.
http://cybersettle.com—Cybersettle.com.
http://www.onlineresolution.com—OnlineResolution—Mediation.
http://www.iescrow.com—I-Escrow Inc.
http://www.resolution.org—Resolution Forum, Inc.
http://www.disputes.org—Disputes.Org.
http://www.ebay.com—eBay Inc.
http://www.betterweb.com—BetterWeb Program.
http://www.digimarc.com—Digimarc.
http://www.webassured.com—WebAssured.com.
http://www.bbbonline.com—BBBOnline (A Better Business Bureau Program).
http://www.valuestar.com—ValueStar, Inc.
http://www.verisign.com—VeriSign Internet Trust Services.
http://www.truste.com—TRUSTe.
http://www.paypal.com—PayPal.
www.shopping.com, 2 pages (last printed Apr. 5, 2005).
www.epinions.com, 2 pages (last printed Apr. 5, 2005).
www.bizrate.com, 2 pages (last printed Apr. 5, 2005).
www.nextag.com, 1 page (last printed Apr. 5, 2005).
www.pricegrabber.com, 2 pages (last printed Apr. 5, 2005).
www.cnet.com, 4 pages (last printed Apr. 5, 2005).
www.buysafe.com, 1 page (last printed Apr. 5, 2005).
www.geotrust.com, 1 page (last printed Apr. 5, 2005).
www.scanalert.com, 1 page (last printed Apr. 5, 2005).
www.hackersafe.com, 1 page (last printed Apr. 5, 2005).
www.comodogroup.com, 2 pages (last printed Apr. 5, 2005).
www.nabp.net, Verified Internet Pharmacy Practice Sites (VIPPS™), A Program of the *National Association of*

*Boards of Pharmacy*, 2 pages (last printed Apr. 5, 2005).
www.webtrust.org/abtseals.htm, 9 pages (last printed Apr. 5, 2005).
www.epubliceye.com, 1 page (last printed Apr. 5, 2005).
www.gomez.com, 1 page (last printed Apr. 5, 2005).
www.visa.com, 1 page (last printed Apr. 5, 2005).
www.guardianecommerce.net, 2 pages (last printed Apr. 5, 2005).
International Search Report from corresponding PCT Application Serial No. PCT/US04/14726, mailed Jun. 1, 2005 (3 pages).

Written Opinion from corresponding PCT Application Serial No. PCT/US04/14726, mailed Jun. 1, 2005 (3 pages).
Nyhart, "Computer Modeling in Dispute Resolution: An Overview," *Dispute Resolution Forum*, Apr. 1988, p 3, 11-15.
Elangovan, "Managerial third-party dispute intervention: A prescriptive model of strategy selection," *Academy of Management Review*, vol. 20, No. 4, pp. 800-830 (Oct. 1995).

* cited by examiner

FIG. 6 ial seals upon verification. In order

CERTIFICATION AND UNIQUE ELECTRONIC SEALS FOR ONLINE ENTITIES

This application is a continuation patent application and claims priority from U.S. patent application Ser. No. 09/634,149, filed Aug. 8, 2000 now U.S. Pat. No. 6,658,394, the entire content of which is incorporated herein by reference.

TECHNICAL FIELD

The present invention relates to electronic seals.

BACKGROUND

One of the difficulties a user faces when engaging other parties online, such as joining online clubs, purchasing items or generally interacting with others, is that the user typically has limited contact with the other parties and, therefore, often has privacy concerns and other legitimate apprehensions. This is especially true when the user wishes to conduct business online, such as in an online marketplace or business-to-business intermediary. As a result, some organizations have established "seal programs" by setting policies and issuing electronic "seals" to companies that adhere to the policies. For example, TRUSTe™ is an independent, non-profit privacy organization that has developed a third-party oversight seal program that tries to alleviates users' concerns about online privacy, TRUSTe issues an electronic seal image to organizations that meet its privacy program. The certified organizations display the seal on their websites to indicate their compliance with the program.

SUMMARY OF THE INVENTION

In general, the invention provides techniques for issuing electronic seals such that non-certified parties cannot easily steal or otherwise misuse the seals. According to one aspect of the invention, a central seal "issuer" verifies the credentials, policies or business practices of online merchants and issues a corresponding seal of certification upon verification. Unlike conventional systems, the seal issuer can generate a unique seal for each merchant. The seal issuer generates the seal in the form of a media object that includes an encrypted watermark containing an expiration date. A central seal server stores the media objects such that the merchants can dynamically retrieve and display the electronic seals as needed. The seal issuer, therefore, can easily revoke or update the seals on the central seal server.

In another aspect, the invention is directed to a method in which a database is accessed to retrieve certification data for a set of online merchants and a corresponding media object is generated for each merchant as a function of the certification data. Each media object represents a seal of certification for the corresponding online merchant. In one configuration, the media objects are generated by an embedding an encrypted digital watermark having an expiration date for the seal. The media objects are stored on a seal server such that each media object can be retrieved according to a unique identifier for the corresponding merchant. Upon receiving such a request, the requested media object is communicated to a client device for presentment to a user.

In yet another aspect, the invention is directed to a computer-readable medium having instructions configured to cause a programmable-processor to perform the methods described herein.

The invention offers several advantages over conventional systems. For example, because the media objects are centrally stored by the seal issuer, and can be unique to each online merchant, each seal can easily be revoked or updated. Furthermore, requests to display the seals can more easily be tracked such that general usage can be reported and misuse can be detected.

Various embodiments of the invention are set forth in the accompanying drawings and the description below. Other features and advantages of the invention will become apparent from the description, the drawings, and the claims.

DETAILED DESCRIPTION

Figure 1:
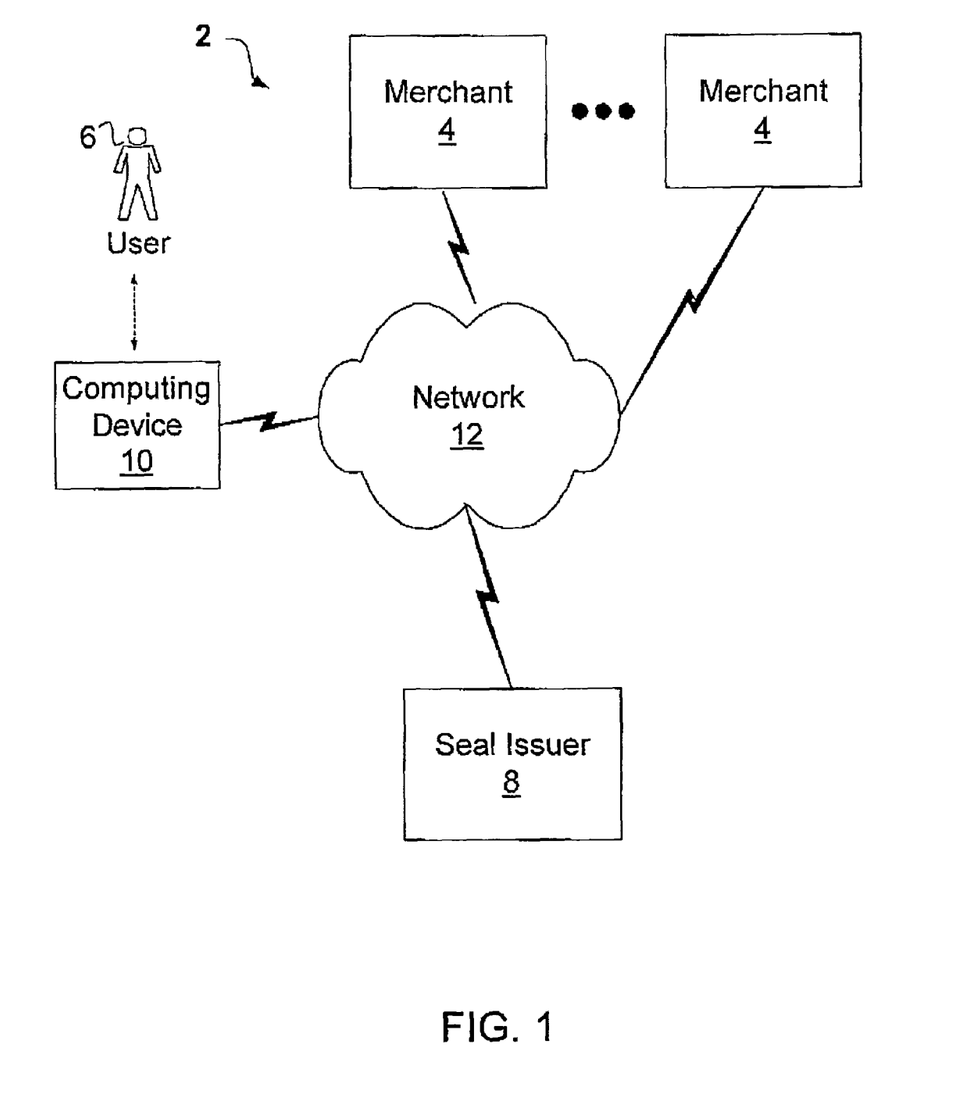
FIG. 1 is a high-level block diagram of an example system configured according the invention.

FIG. 1 is a high-level block diagram of a system 2 in which online merchants 4 provide goods and services to user 6. Merchants 4 represent business entities that transact goods or services over network 12, which represents a network of computing resources such as the Internet. For example, a merchant 4 can be a buyer or seller of goods, such as books, movies, software, computers, semiconductor components and the like. A merchant 4 can also be an entity that provides services over network 12, such as an online storage provider, an Application Service Provider (ASP) or even an online marketplace or other intermediary. Although described in the context of a business entity, merchants 4 can also be any entity having an online presence.

User 6 uses computing device 10 to remotely interact with merchants 4 over network 12. Computing device 10 represents any communication device suitable for interfacing with network 12 and interacting with merchants 4 such as a personal computer running a web browser such as Internet Explorer™ from Microsoft Corporation of Redmond, Wash. Alternatively, computing device 4 can be, for example, a personal digital assistant (PDA), such as a Palm™ organizer from Palm Inc. of Santa Clara, Calif., or a network-enabled cellular telephone.

Seal issuer 8 verifies the credentials, policies or business practices of each Merchant 4 and issues a corresponding seal of certification to each merchant 4 upon verification. In order to become a "seal holder", each merchant 4 must comply with requirements set by seal issuer 8. For example, seal issuer might, for example, verify that merchant 4 is a legitimate business merchant that complies with, or agrees to conform to, certain standards. For example, seal issuer 8 may be an online dispute resolution service that is designed to help buyers and sellers settle issues involving online transactions, such as issues that may arise in an online auction. In this instance, seal issuer 8 issues an electronic seal to merchants 4 that agree to participate in the web-based problem solving service. As another example, seal issuer 8 can be an organization that verifies merchants 4 compliance with privacy or security requirements. Alternatively, for example, seal issuer 8 may perform a nominal amount of certification before issuing the seal such as verifying the contact information.

Upon verifying a merchant 4, seal issuer 8 issues the merchant 4 an electronic seal that is a recognizable symbol associated with certain qualities such as trustworthiness, reliability, and superior customer service. Merchants 4 post their corresponding electronic seals on their web sites or in electronic mail messages (emails) in order to increase the confidence of potential customers. Unlike conventional techniques, seal issuer 8 does not issue a static image to merchants 4. As described in detail below, seal issuer 8 generates and maintains a unique electronic seal for each merchant 4. As such, seal issuer 8 can instantly issue, update, change, or revoke a seal when a merchant 4 fails to comply with the requirements. In addition, seal issuer 8 tracks the use of all issued electronic seals in order to detect any misuse or theft of the seal.

Figure 2:
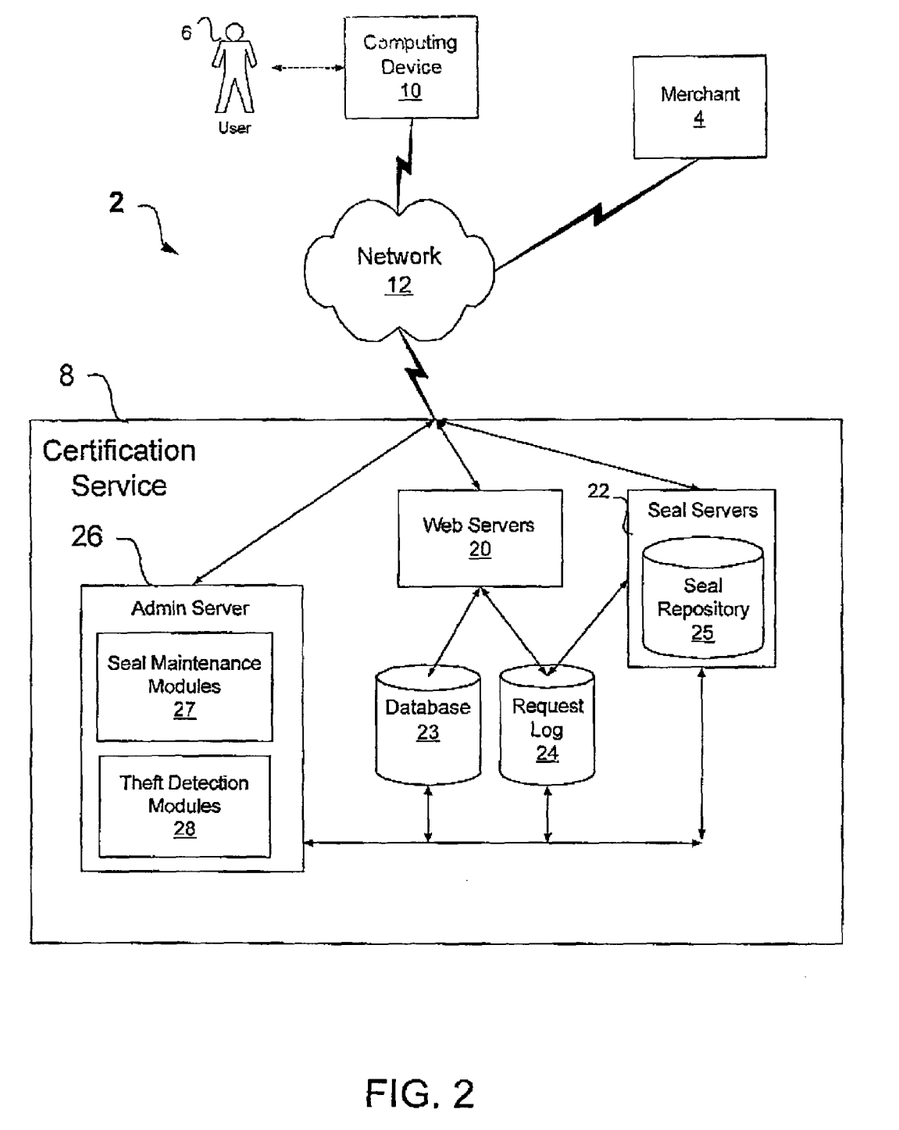
FIG. 2 is a more detailed block diagram of an example system configured according to the invention.

FIG. 2 is a block diagram illustrating one example of seal issuer 8. Seal issuer 8 includes web servers 20, seal servers 22, administration ("admin") server 26, database 23, request log 24 and seal repository 25.

Web servers 20 provide an interface for communicating with computing device 10 via network 12. Web servers 20 execute web server software, such as Internet Information Server™ from Microsoft Corporation, of Redmond, Wash., and provide an environment for interacting with users 6 and merchants 4, such as when merchants 4 apply for seals or when users 6 request more information about a certified merchant 4. Web servers 20 serve web pages and communicate the web pages over network 12. The web pages may include static media such as text and graphic imagery, as well as conventional input media such as text entry boxes, radio buttons, drop-down menus, and the like.

Seal servers 22 provide access to seal repository 25, which stores a set of media objects that represent the electronic seals. Each media object contains media, such as image data, video data, and audio data, that merchant 4 presents as an electronic seal of certification. Each media object corresponds to one of the merchants 4 and can be retrieved from seal repository 25 based on a unique identifier for the corresponding merchant. In one configuration, each media object is given a unique file name and stored within a file system provided by seal server 22 such that computing device 10 can directly retrieve the media object without requiring that seal issuer 8 access a database. In addition to the media, such as the image data, each media object contains a watermark having encrypted information such as an expiration date, a time stamp and the unique identifier for the corresponding merchant 4.

Database 23 stores information for each merchant 4 such as current certification status, contact information and an expiration date for each merchant's unique seal. Request log 24 stores all requests for the media objects and the merchant information.

Admin server 26 provides administrative functionality for seal issuer 8 and provides an operating environment for a number of software modules including seal maintenance modules 27 and theft detection modules 28. Seal maintenance modules 27 are responsible for generating a unique media object when a new merchant 4 is certified and updating the media object if the merchant loses its certified status. In addition, seal maintenance modules 27 periodically regenerate the media objects, including updating the embedded expiration date and the timestamp.

Upon certifying a merchant 4, seal maintenance modules 27 generate a corresponding media object and issue code for use by the merchant to uniquely reference the media object. For example, a merchant 4 having a unique identifier of 1520511267 can use the following code to reference a media object housed within seal servers 22:

```
<a HREF="http: //sealissuer.com/1520511267.map"
TARGET="_blank"><IMG ISMAP SRC="http: //
sealissuer.com/1520511267.gif" ALT="Click to verify"
BORDER=0></a>
```

The above code uses server-side image maps such that when user 6 clicks on any area of the presented image, the pixel coordinate information is transmitted to seal issuer 8 where it is remotely translated into an appropriate action. This advantageously removes any client-side scripting dependencies and greatly reduces the size of the client-side code required to display the seal.

Theft detection modules 28 analyze request log 24 in order to detect any misuse or theft of an electronic seal. For example, when a seal is requested, seal servers 22 record the internet protocol (IP) address of the requesting merchant within request log 24. In addition, when user 6 clicks on the seal to verify the seal, web servers 20, provide the information to the user and log the IP address of computing device 10. Theft detection modules 28 analyze request log 24 to detect any new or unexpected IP addresses. Upon detecting misuse, seal maintenance modules 27 issue a new seal to the affected merchant 4 by generating a new media object, storing the media object within seal repository 25, and instructing the merchant to update its website software to point to the new seal.

Theft detection modules 28 also use spidering technology to search network 12 for all occurrences of issued seals. Upon finding a seal, theft detection modules 28 decrypt the embedded watermark, determine whether the seal has expired, inform any interested parties of the expiration and optionally revoke the expired seal.

Figure 3:
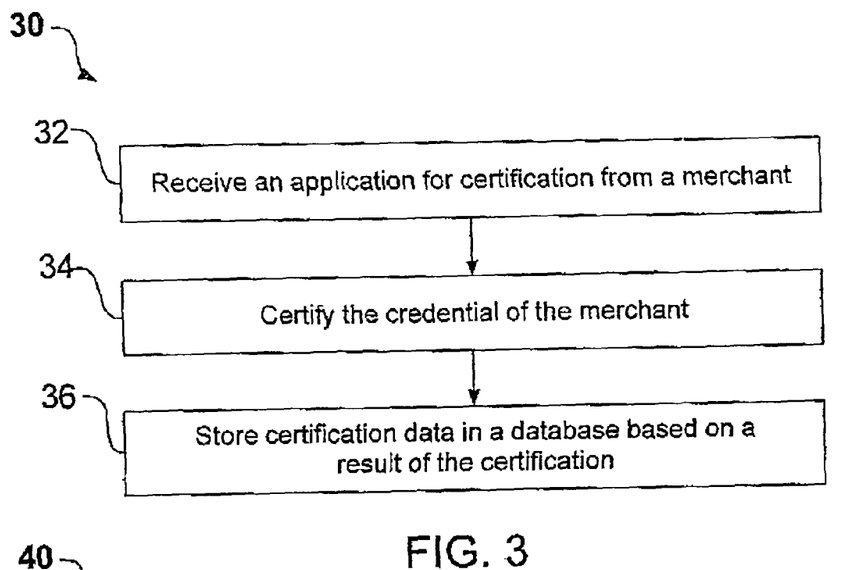
FIG. 3 is a flowchart illustrating an example process in which the system certifies online merchants.

FIG. 3 is a flowchart illustrating an example process 30 in which seal issuer 8 certifies an online merchant 4. First, seal issuer 8 receives an application from merchant 4 including contact information, business organization and location. This request may be received electronically via network 12 or through conventional communication mechanisms such as the postal service (step 32). Seal issuer 8 researches merchant 4, verifies that the merchant is a legitimate business organization and certifies that the merchant's business practices meet all standards necessary to obtain the seal (step 34). Upon certifying merchant 4, seal issuer 8 stores the certification data in database 23 (step 36).

Figure 4:
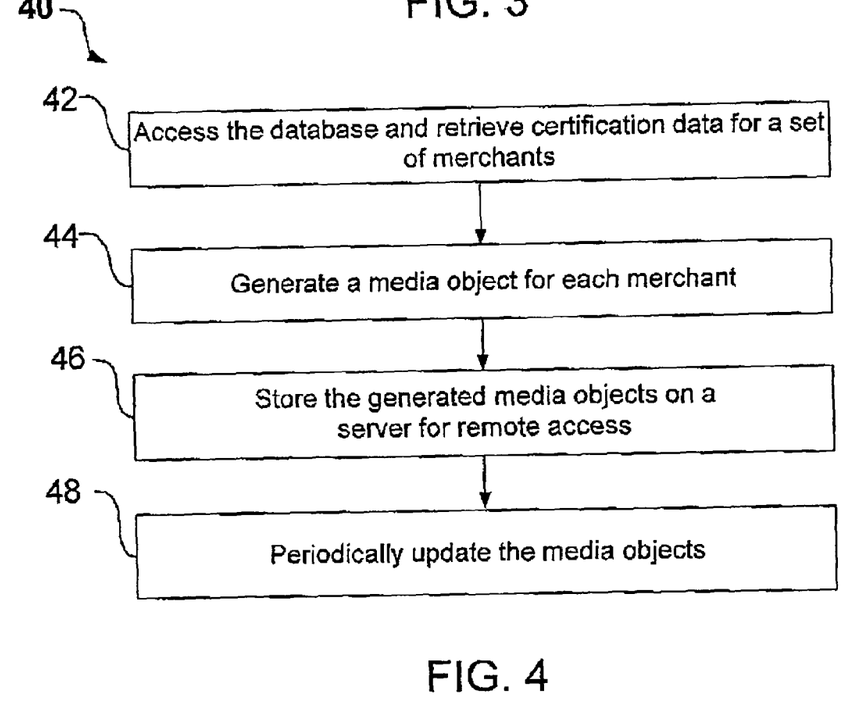
FIG. 4 is a flowchart illustrating an example process in which the system generates and maintains a set of media objects that represent electronic seals of certification.

FIG. 4 is a flowchart illustrating an example process 40 in which seal issuer 8 generates and maintains the media objects within seal repository 25. Upon verifying one or more merchants 4, seal maintenance modules 27 access database 23 and retrieve the certification data for each certified merchant 4. Next, based on this information, seal maintenance modules 27 generate a unique media object for each merchant 4 (step 44) and store the media objects within seal servers 22 (step 46) such that computing device 10 can remotely access the media objects. Next, seal maintenance modules 27 periodically regenerate the media objects in order to update the embedded information including the expiration date (step 48). For example, a new set of media objects can be generated daily in order to facilitate detection of expired seals. In one configuration, seal issuer 8 generates a media object having a transparent image when the corresponding merchant 4 loses its certification status. In this manner, the seal "disappears" from the merchant web site.

Figure 5:
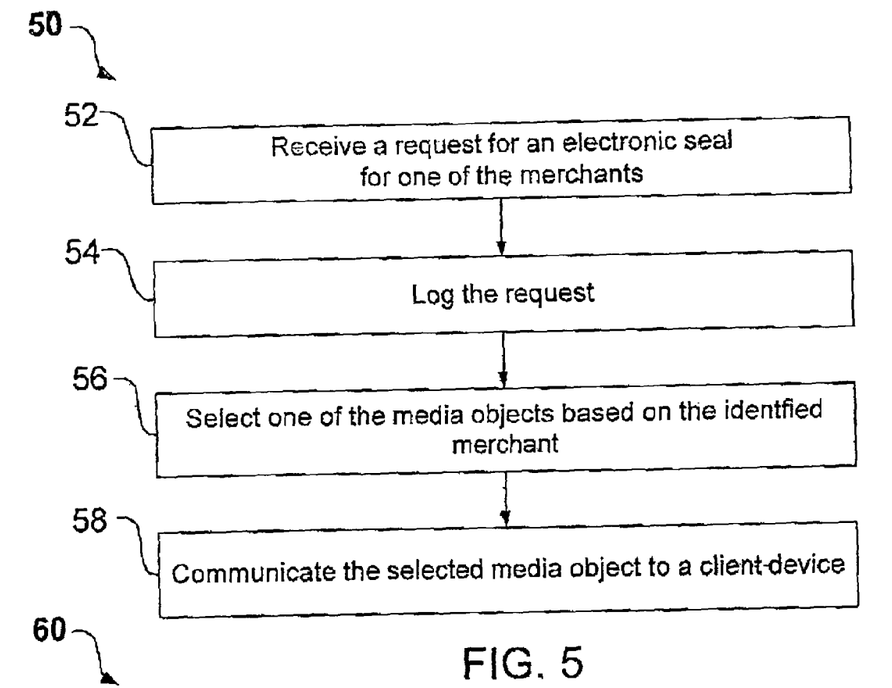
FIG. 5 is a flowchart illustrating an example process in which the system services requests from the online merchants to present the electronic seals.

FIG. 5 is a flowchart illustrating an example process 50 in which seal issuer 8 services requests from the online merchants 4 to present the electronic seals to user 6. When user 6 accesses a merchant 4, client device 10 is directed to retrieve a seal from seal servers 22. More specifically, seal servers 22 receive a request from computing device 10 that includes a unique identifier for one of the merchants and, therefore, uniquely identifies one of the media objects within seal repository 25 (step 52). Seal servers 22 log the request by storing the IP address within request log 24 (step 54) and select the appropriate media object according to the unique identifier (step 56). For example, seal servers 22 may simply identify an appropriate file that stores the media object based on the unique identifier. Upon selecting the media object, seal servers 22 communicate the media object to computing device 10, which in turn presents the media to user 6 (step 58).

Figure 6:
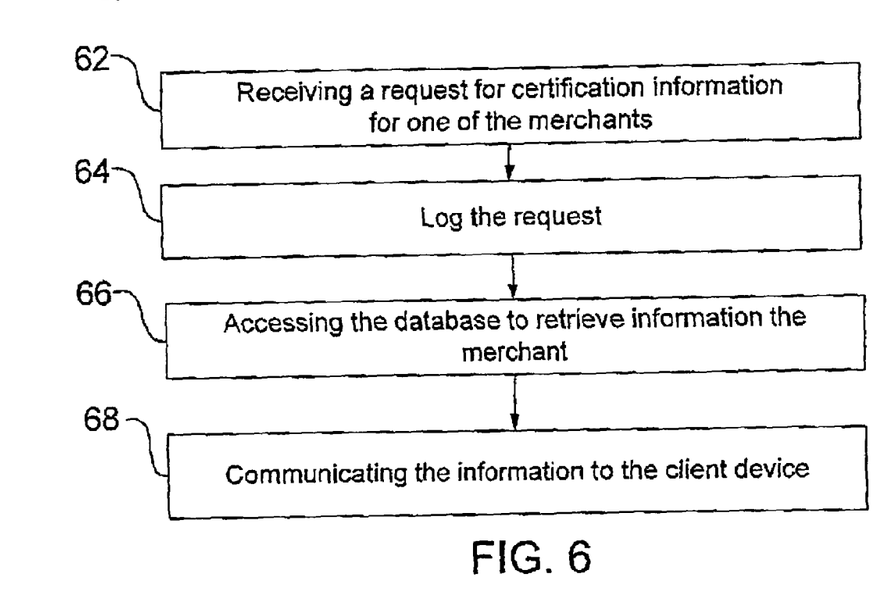
FIG. 6 is a flowchart illustrating an example process in which the system services requests from users to view certification information for the online merchants.

FIG. 6 is a flowchart illustrating an example process 60 in which the seal issuer 8 services user requests to verify a seal by viewing certification information for the online merchants 4. After the media is presented to user 6, as described above, the user 6 has the option to click on the displayed media to view the certification information for the merchant 4. For example, when the user clicks an image, web servers 20 receive pixel information describing where the user clicked on the image as well as a unique identifier for the merchant (step 62). Upon receiving the request, web servers 20 log the request (step 64) and access database 23 to retrieve information relating to the identified merchant (step 66). Web servers 20 assemble the retrieved data into a web page and serve the web page to client device 10 for display to user 6 (step 68). Alternatively, web servers 20 direct computer device 10 to a static web page for the corresponding merchant 4.

In one configuration, web servers 20 filters the information based on one or more stored settings, such as an anonymity parameter, which causes web servers 20 to filter contact information for the merchant 4. In another configuration, web servers 20 monitor the requesting universal resource locator (URL) for merchant 4 and filter the information accordingly. In this manner, seal issuer 4 can filter contact information when the seal is used by online intermediaries that prevent buyers from directly contacting sellers.

Various embodiments have been described for issuing electronic seals of certification to online entities, such as online merchants. These and other embodiments are within the scope of the following claims.

The invention claimed is:

1. A method comprising:
    certifying a plurality of online entities;
    storing certification data for each of the plurality of online entities in a database; and
    selectively generating corresponding media objects for the online entities for which the respective certification data indicates successful certification, wherein each of the media objects includes media to present a unique seal of certification for each of the entities.

2. The method of claim 1,
    wherein certifying a plurality of online entities comprises certifying that the online entities agree to participate in an online dispute resolution process associated with an online marketplace, and
    wherein generating corresponding media objects comprises generating the media objects to provide a visual indicator that the respective online entities have been certified as agreeing to participate in the online dispute resolution process.

3. The method of claim 1, wherein generating corresponding media objects comprises generating the media objects as recognizable symbols associated with qualities of the online entities including at least one of trustworthiness, reliability, and superior customer service.

4. The method of claim 1, further comprising:
    periodically updating the certification data for the entities; and
    modifying the media objects based on the updated certification data.

5. The method of claim 4, wherein modifying the media objects comprises:
    generating the media objects to have a first visual appearance when the certification data indicates the entity is certified; and
    generating the media objects to have different visual appearances when the certification data indicates that the certifications have been revoked.

6. The method of claim 4, wherein modifying the media objects comprises deleting one of the media objects based on the updated data.

7. The method of claim 1, wherein certifying a plurality of online entities comprises verifying that the entities are legitimate business entities.

8. The method of claim 1, wherein certifying a plurality of online entities comprises verifying at least one of: (a) that a business practice of the entities conforms to a standard, and (b) that the entities agree to conform to the standard.

9. The method of claim 1, wherein certifying a plurality of online entities comprises certifying the online entities upon receiving agreements to participate in online dispute resolution from the entities.

10. The method of claim 1, wherein certifying a plurality of online entities comprises receiving an application for certification via a network.

11. The method of claim 1, wherein the entities comprise online merchants, and the certification data includes transaction histories for the entities.

12. The method of claim 1, wherein the media objects comprise images.

13. A computer-readable medium comprising instructions that cause a programmable processor to:
    store certification data for a plurality of online entities within a database; and
    generate corresponding media objects for each of the online entities based on the certification data, wherein each of the media objects includes media to present a unique seal of certification for each of the entities.

14. The computer-readable medium of claim 13, further comprising instructions that cause a programmable processor to:
    periodically update the certification data for the entities; and
    modify the media objects based on the updated certification data.

15. The computer-readable medium of claim 14, wherein the instructions that cause a programmable processor to modify the media objects comprise instructions that cause a programmable processor to:
generate the media objects to have a first visual appearance when the certification data indicates the entity is certified; and
generate the media objects to have different visual appearances when the certification data indicates that the certifications have been revoked.

16. The computer-readable medium of claim 14, wherein the instructions that cause a programmable processor to modify the media objects comprises instructions that cause a programmable processor to delete one of the media objects based on the updated data.

17. The computer-readable medium of claim 13, wherein the instructions that cause a programmable processor to store certification data comprise instructions that cause a programmable processor to store data indicating whether the entities are a legitimate business entities.

18. The computer-readable medium of claim 13, wherein the instructions that cause a programmable processor to store certification data comprise instructions that cause a programmable processor to store data indicating at least one of (a) whether a business practice of the entities conforms to a standard, and (b) whether the entities agree to conform to the standard.

19. The computer-readable medium of claim 13, wherein the instructions that cause a programmable processor to store certification data comprise instructions that cause a programmable processor to store data indicating whether the entities have agreed to participate in online dispute resolution.

20. The computer-readable medium of claim 13, further comprising instructions that cause a programmable processor to receive an application for certification via a network.

21. The computer-readable medium of claim 13, wherein the entities comprise online merchants, and the instructions that cause a programmable processor to store certification data comprise instructions that cause a programmable processor to store transaction histories for the entities.

22. The computer-readable medium of claim 13, wherein the media objects comprise images.

23. A system comprising:
a database to store certification data for a plurality of online entities; and
a server to access the certification data, and generate corresponding media objects for each of the online entities based on the certification data, wherein each of the media objects includes media to present a unique seal of certification for each of the entities.

24. The system of claim 23, wherein the server generates the media objects as recognizable symbols associated with qualities of the online entities including at least one trustworthiness, reliability, and superior customer service.

25. The system of claim 23, wherein the server periodically accesses the database to update the certification data for the entities, and modifies the media objects based on the updated certification data.

26. The system of claim 25, wherein the server generates the media objects to have a first visual appearance when the certification data indicates the entity is certified, and generates the media objects to have different visual appearances when the certification data indicates that the certifications have been revoked.

27. The system of claim 25, wherein the server deletes one of the media objects based on the updated data.

28. The system of claim 23, wherein the database stores data that indicates whether the entities are legitimate business entities.

29. The system of claim 23, wherein the database stores data that indicates at least one of (a) whether a business practice of the entities conforms to a standard, and (b) whether the entities agree to conform to the standard.

30. The system of claim 26, wherein the database stores data that indicates whether the entities have agreed to participate in an online dispute resolution associated with an online marketplace, and wherein the server generates the media objects to provide a seal of certification indicating that the respective online entities have agreed to participate in the online dispute resolution process.

31. The system of claim 23, wherein the server receives an application for certification from one of the entities via a network.

32. The system of claim 23, wherein the entities comprise online merchants, and the database stores transaction histories for the entities.

33. The system of claim 23, wherein the media objects comprise images.

34. A method for providing electronic seals of certification for participants in an online marketplace or other intermediary that is accessed via a computer network and enables participants to buy and sell items comprising:
certifying participants in the online marketplace;
storing information for each of the participants within a database, the information for each participant including certification data that indicates a certification status that participant; and
generating corresponding media objects for each of the participants based on the certification data stored in the database, wherein each of the media objects includes media to present a unique seal of certification for each of the participants that indicates the certification status of that participant, and
wherein the media objects have a first visual appearance when the certification data indicates that entity is certified, and different visual appearances when the certification data indicates that the certifications have been revoked.

35. The method of claim 34, further comprising:
receiving a request from a web browser executing on a client device for one of the media objects; and
communicating the requested media object to the web browser for presentment of the respective seal of certification to a user as a portion of a website associated with the online marketplace to indicate the certification status of the one of the participants in the online marketplace associated with the requested media object.

36. The method of claim 34, wherein certifying participants comprises certifying sellers within the marketplace, and
wherein communicating the requested media object to the web browser for presentment of the respective seal of certification as a portion of a website comprises communicating the requested media object to the web browser for presentment of the respective seal of certification to a buyer as a portion of a web page associated with the seller.

37. The method of claim 34, wherein certifying participants in an online marketplace comprises verifying that the participants are a legitimate business entities.

38. The method of claim 34, wherein certifying participants in an online marketplace comprises at least one of verifying that a business practice of the participants conforms to a standard and that the participants agree to conform to certain standards.

39. The method of claim 34, wherein certifying participants in an online marketplace comprises certifying the participant upon receiving agreements to participate in online dispute resolution from the participants.

40. A system comprising:
a database to store certification data and information for each of a plurality of online entities; and
a server to generate corresponding media objects for each the online entities based on the certification data, wherein each of the media objects includes media to present a unique seal for each of the entities, communicate a requested one of the media objects to a web browser for presentment of the respective seal to a user as a portion of a website, and selectively provide the information stored within the database for the entity associated with requested media object to the user via the web browser.

41. The system of claim 40, wherein after communicating the requested media object to the client device, the server receives a request from the client device to view additional information for the entity corresponding to the requested media object, retrieves the information as a function of a unique identifier provided by the request, and communicates the information to the client device for display to the user.

42. The system of claim 40, wherein the entity comprises an online merchant and the information includes a transaction history for the merchant.

43. The system of claim 40, where the server stores a disclosure setting for each entity, and filters the information based on the disclosure setting.

44. The system of claim 43, wherein the server filters the information based on a universal resource locator (URL) received during the request for the information.

45. The system of claim 40, wherein the server provides a web page that includes the information to the user.

46. The method of claim 1, wherein selectively generating corresponding media objects comprises dynamically generating the media objects to display dates as part of the seal of certifications.

47. The method of claim 46, wherein the dates comprise expiration dates for the seals of certification.

48. The method of claim 1, wherein selectively generating corresponding media objects comprises dynamically generating the media objects to display times as part of the seal of certifications.

49. The method of claim 46, wherein the dates comprise timestamps for the seals of certification.

50. The method of claim 1, wherein selectively generating corresponding media objects comprises dynamically generating the media objects to display identities of the online entities as part of the seal of certifications.

51. The method of claim 1, wherein selectively generating corresponding media objects comprises dynamically generating the media objects to display credentials of the online entities as part of the seal of certifications.

52. The method of claim 1, wherein selectively generating corresponding media objects comprises dynamically generating the media objects to display policies or business practices of the online entities as part of the seal of certifications.

53. The method of claim 1, wherein selectively generating corresponding media objects comprises dynamically generating the media objects to display contact information for the online entities as part of the seal of certifications.

54. The method of claim 1, wherein selectively generating corresponding media objects comprises selectively displaying the media objects.

55. The method of claim 1, further comprising communicating at least one of the media objects via an electronic mail message.

56. The method of claim 1, wherein certifying the plurality of online entities comprises verifying that the online entities comply with security requirements.

57. The computer-readable medium of claim 13, wherein the instructions cause the programmable processor to selectively generate corresponding media objects comprises selectively displaying the media objects.

58. The computer-readable medium of claim 13, wherein the instructions cause the programmable processor to communicate at least one of the media objects via an electronic mail message.

59. The computer-readable medium of claim 13, wherein the instructions cause the programmable processor to generate the certification data by verifying that the online entities comply with security requirements.

60. The system of claim 23, wherein the server selectively generates the media objects by selectively displaying the media objects within a web page.

61. The system of claim 23, wherein the server communicates at least one of the media objects via an electronic mail message.

62. The system of claim 23, wherein the certification data indicates whether the plurality of online entities comply with security requirements.

63. The system of claim 40, wherein the server generates the media objects by displaying the media objects within a web page associated with the website.

64. The system of claim 40, wherein the server communicates at least one of the media objects via an electronic mail message.

65. The system of claim 40, wherein the certification data indicates whether the plurality of online entities comply with security requirements.

66. The system of claim 23, wherein the server includes a plurality of computing devices.

67. The system of claim 23, wherein the server and the database are provided by a common computing device.

68. The system of claim 40, wherein the server includes a plurality of computing devices.

69. The system of claim 40, wherein the server and the database are provided by a common computing device.

70. A method comprising:
certifying a plurality of online entities;
storing certification data for each of the plurality of online entities in a database;
accessing the stored certification data to determine current certification status for the online entities; and
selectively displaying media objects to present seals of certification for the entities in accordance with the certification data when the current certification status for the online entities is valid.

71. The method of claim 70, wherein selectively displaying comprises displaying the media objects as unique seals of certification for each of the entities.

72. The method of claim 70,
wherein certifying a plurality of online entities comprises certifying that the online entities agree to participate in an online dispute resolution process associated with an online marketplace, and
wherein selectively displaying corresponding media objects comprises displaying the media objects to provide a visual indicator that the respective online entities have been certified as agreeing to participate in the online dispute resolution process.

73. The method of claim 70, wherein selectively displaying corresponding media objects comprises displaying the media objects as recognizable symbols associated with qualities of the online entities including at least one of trustworthiness, reliability, and superior customer service.

74. The method of claim 70, further comprising:
updating the certification data for the entities; and
dynamically displaying the media objects based on the updated certification data.

75. The method of claim 74, wherein dynamically displaying the media objects comprises:
displaying the media objects to have a first visual appearance when the certification data indicates the entity is certified; and
displaying the media objects to have different visual appearances when the certification data indicates that the certifications have been revoked.

76. The method of claim 70, further comprising dynamically disabling the display of at least one of the media objects when the certification data indicates that a certification for the corresponding entity has been revoked.

77. The method of claim 70, wherein certifying a plurality of online entities comprises at least one of:
verifying that the entities are legitimate business entities;
verifying that a business practice of the entities conforms to a standard;
verifying that the entities agree to conform to the standard; and
verifying that the online entities agree to participate in an online dispute resolution process.

78. The method of claim 70, wherein certifying a plurality of online entities comprises receiving an application for certification via a network.

79. The method of claim 70, wherein the entities comprise online merchants, and the certification data includes transaction histories for the entities.

80. The method of claim 70, wherein the media objects comprise images.

81. The method of claim 70, wherein selectively displaying media objects comprises dynamically displaying the media objects to display dates as part of the seal of certifications.

82. The method of claim 70, wherein selectively displaying media objects comprises dynamically displaying the media objects to display times as part of the seal of certifications.

83. The method of claim 70, wherein selectively displaying media objects comprises dynamically displaying the media objects to display identities of the online entities as part of the seal of certifications.

84. The method of claim 70, wherein selectively displaying media objects comprises dynamically displaying the media objects to display credentials of the online entities as part of the seal of certifications.

85. The method of claim 70, wherein selectively displaying media objects comprises dynamically displaying the media objects to display policies or business practices of the online entities as part of the seal of certifications.

86. The method of claim 70, wherein selectively displaying media objects comprises dynamically displaying the media objects to display contact information for the online entities as part of the seal of certifications.

87. The method of claim 70, further comprising communicating at least one of the media objects via an electronic mail message.

88. The method of claim 70, wherein certifying the plurality of online entities comprises verifying that the online entities comply with security requirements.

89. The method of claim 70, wherein selectively displaying comprises:
receiving a request from a web browser executing on a client device for one of the media objects; and
communicating the requested media object to the web browser for presentment to a user as a portion of a website associated with an online marketplace to indicate the certification status of a participant in the online marketplace associated with the requested media object.

90. The method of claim 70, wherein selectively displaying comprises:
receiving a request from a web browser executing on a client device for one of the media objects; and
communicating the requested media object to the web browser for presentment to a user as a portion of a web site.

91. The method of claim 70, wherein online entity comprise one of a merchant or an entity having an online presence with a network.

\* \* \* \* \*